(12) United States Patent
Kono

(10) Patent No.: US 9,217,908 B2
(45) Date of Patent: Dec. 22, 2015

(54) OPTICAL MODULATOR

(71) Applicant: SUMITOMO ELECTRIC INDUSTRIES, LTD., Osaka-shi, Osaka (JP)

(72) Inventor: Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/250,636

(22) Filed: Apr. 11, 2014

(65) Prior Publication Data

US 2014/0307996 A1    Oct. 16, 2014

(30) Foreign Application Priority Data

Apr. 12, 2013  (JP) .................. 2013-084044

(51) Int. Cl.
*G02F 1/035* (2006.01)
*G02F 1/225* (2006.01)
*G02F 1/21* (2006.01)

(52) U.S. Cl.
CPC .............. *G02F 1/225* (2013.01); *G02F 1/2255* (2013.01); *G02F 1/2257* (2013.01); *G02F 2001/212* (2013.01); *G02F 2203/19* (2013.01); *G02F 2203/20* (2013.01); *G02F 2203/25* (2013.01)

(58) Field of Classification Search
CPC ......... G02F 1/21; G02F 1/225; G02F 1/2257; G02F 2001/212; G02F 2203/19; G02F 2203/20; G02F 2203/25

USPC .................. 385/1–3; 359/237–239, 245–246, 359/248–249, 251, 254–255, 266
See application file for complete search history.

(56) References Cited

U.S. PATENT DOCUMENTS

| 8,391,724 | B2 * | 3/2013 | Aruga et al. .................. 398/198 |
| 2011/0064351 | A1 * | 3/2011 | Kise et al. .......... 385/3 |
| 2011/0158576 | A1 * | 6/2011 | Kissa et al. ......... 385/3 |
| 2011/0182590 | A1 * | 7/2011 | Secondini et al. ........... 398/186 |
| 2012/0008963 | A1 * | 1/2012 | Aruga et al. ................. 398/183 |

FOREIGN PATENT DOCUMENTS

| JP | 07-049473 | 2/1995 |
| JP | 2011-112873 | 6/2011 |

* cited by examiner

*Primary Examiner* — Ryan Lepisto
*Assistant Examiner* — Guy Anderson
(74) *Attorney, Agent, or Firm* — Smith, Gambrell & Russell LLP

(57) ABSTRACT

An optical modulator includes main input and output ports; first and second Mach-Zehnder modulators; a first branching waveguide optically coupling the main input port to the first and second Mach-Zehnder modulators; a first driver circuit connected to the first Mach-Zehnder modulator, the first driver circuit generating a first drive signal having a first amplitude at a first bias point; and a second driver circuit connected to the second Mach-Zehnder modulator, the second driver circuit generating a second drive signal having a second amplitude at a second bias point. The first and second drive signals satisfy at least one of a first condition and a second condition. The first condition is that the first amplitude differs from the second amplitude. The second condition is that the first bias point differs from the second bias point.

8 Claims, 11 Drawing Sheets

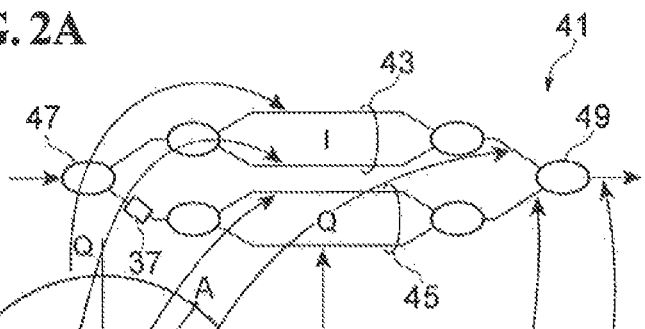
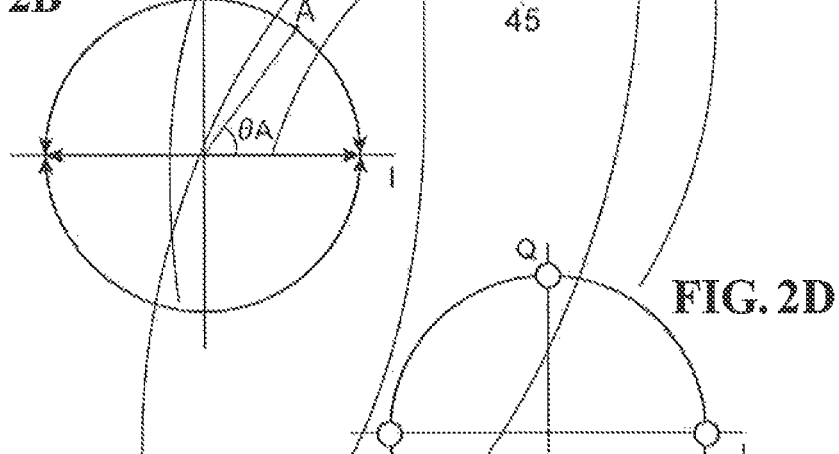
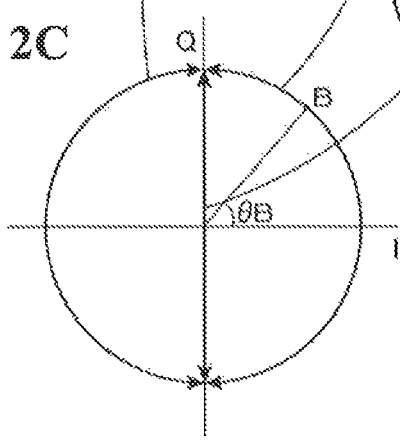

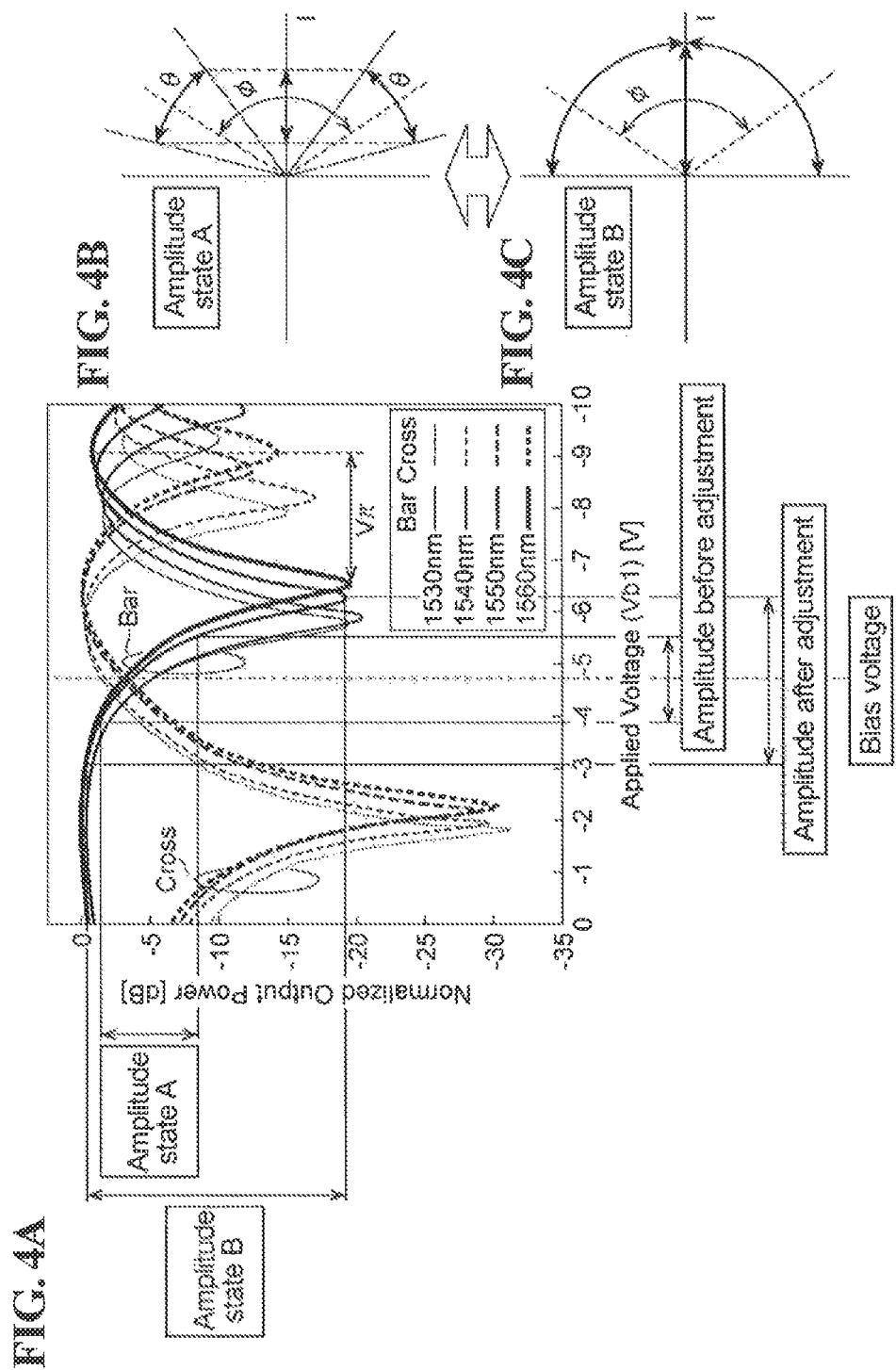

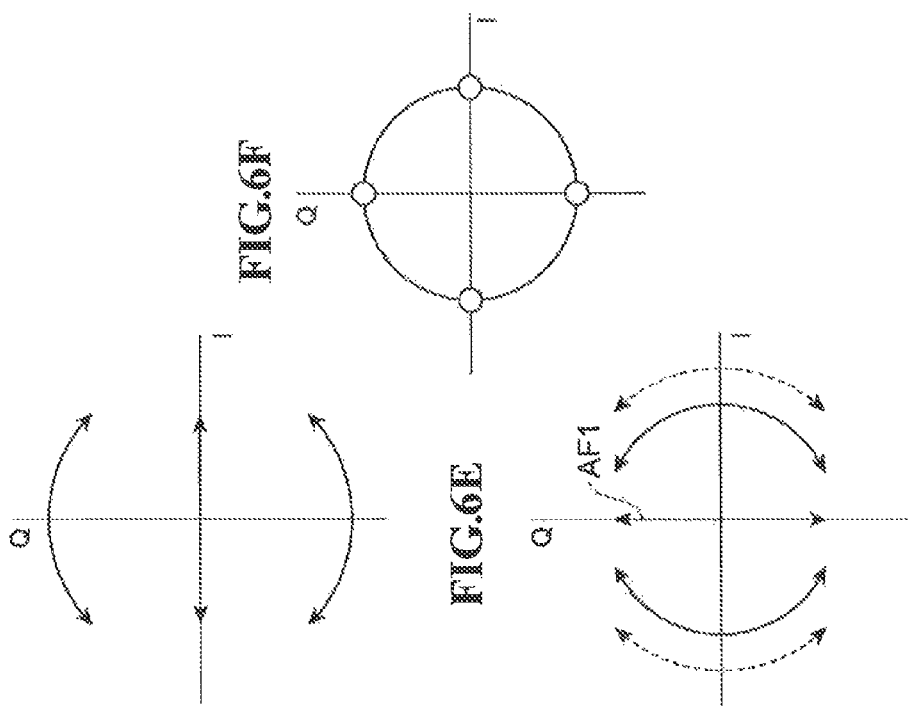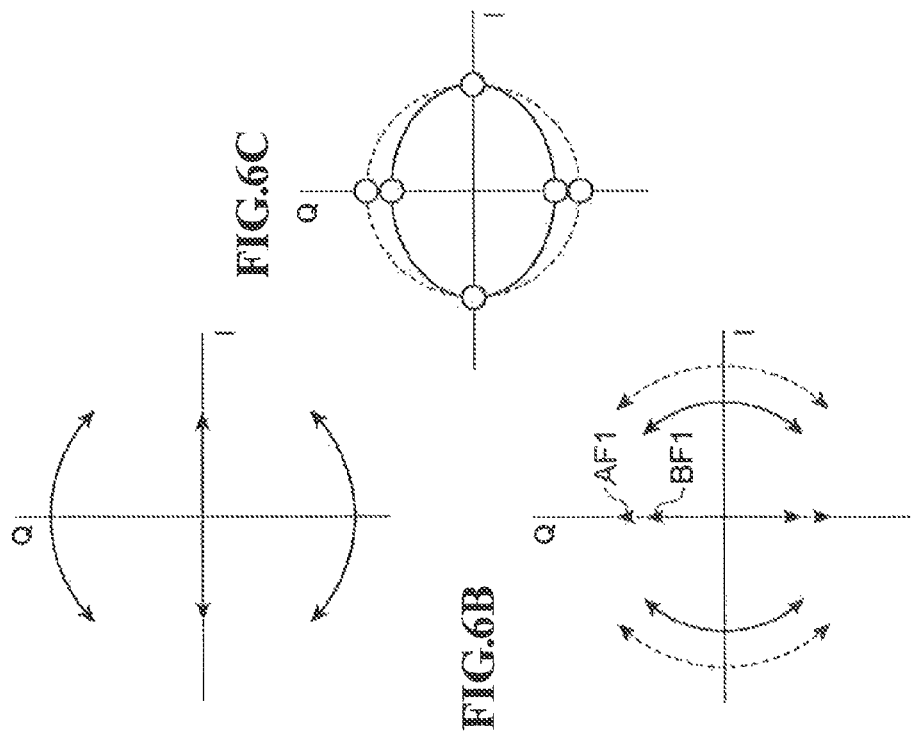

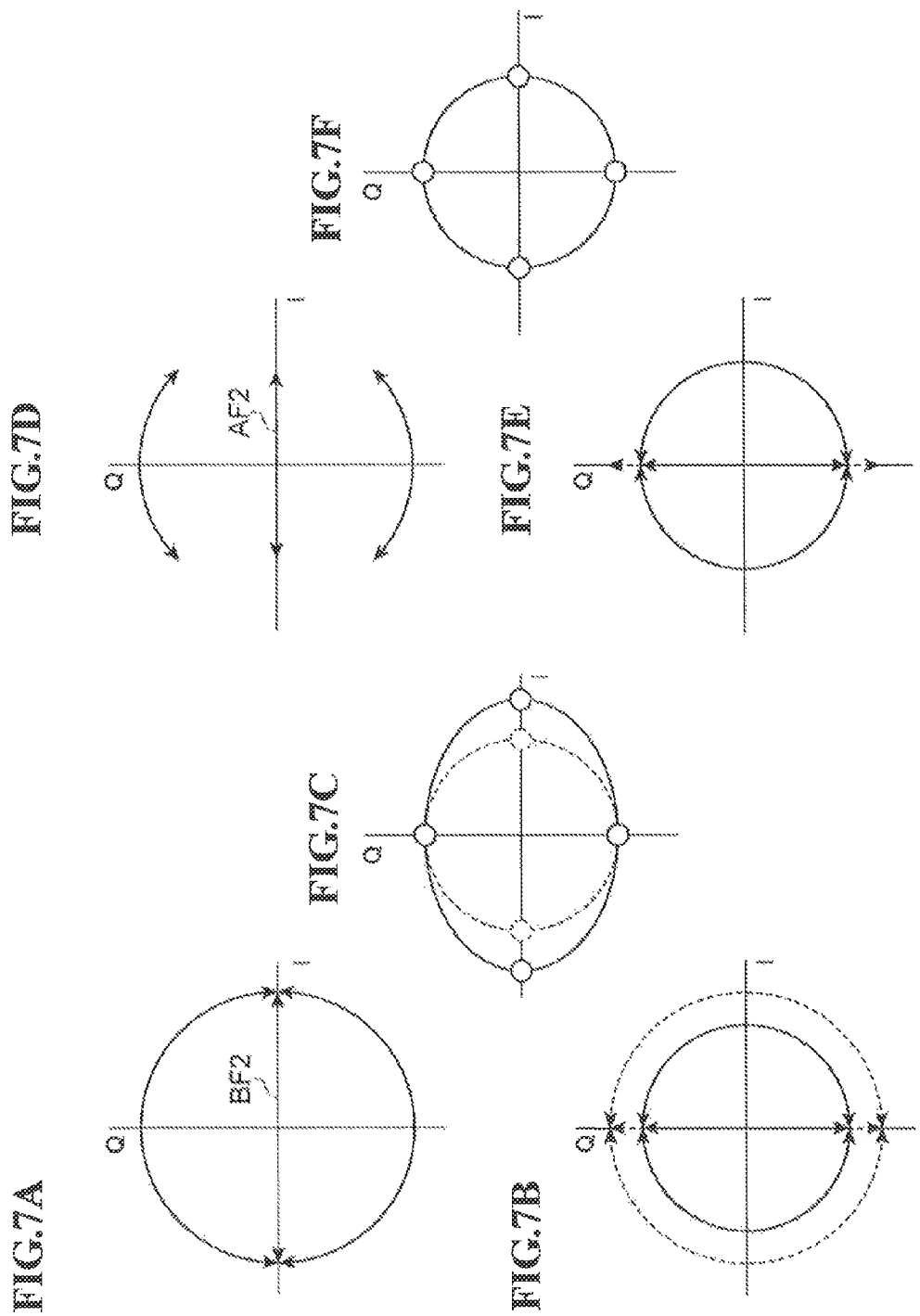

OPTICAL MODULATOR

BACKGROUND OF THE INVENTION

1. Field of the Invention

The present invention relates to an optical modulator.

2. Description of the Related Art

Japanese Unexamined Patent Application Publication No. 2011-112873 (Patent literature 1) discloses a multi-level optical phase modulator. Japanese Unexamined Patent Application Publication No. 7-049473 (Patent literature 2) discloses a Mach-Zehnder (MZ) optical modulator that provides modulated light with a high extinction ratio.

The multi-level optical phase modulator in Patent literature 1 includes a light intensity adjuster disposed between a phase modulation portion of a MZ optical modulator and an optical branching unit. The light intensity adjuster includes a gain medium and adjusts the intensity of input light to a predetermined intensity by means of the gain saturation characteristics of the gain medium.

SUMMARY OF THE INVENTION

The MZ optical modulator in Patent literature 2 includes a light intensity modulator as well as phase modulators. To fabricate the MZ optical modulator including the light intensity modulator, which is made of a gain/absorption medium, it is necessary to add a difficult and complicated process.

The process for integrating an optical waveguide with gain saturation characteristics into the MZ optical modulator is difficult and complicated. For example, a modulation layer (core layer) in a waveguide of a MZ optical modulator is made of an InGaAsP multi-quantum-well (MQW) structure, which has a photoluminescence (PL) peak wavelength shorter than the wavelength of input light, or a $LiNb_2O_3$ crystal. This modulation layer does not serve as a gain medium for input light. For example, $SiO_2$ doped with a rare earth element such as erbium or ytterbium, or InGaAsP having a PL wavelength similar to the wavelength of light may be used for the gain medium. Thus, a medium with gain saturation characteristics is composed of a material different from the material of the modulation layer. Therefore, the medium with gain saturation characteristics needs to be integrated into the MZ optical modulator in a hybrid or monolithic manner. The integration of such a different material involves a difficult process.

Accordingly, an optical modulator according to the invention includes (a) a main input port; (b) a main output port; (c) a first Mach-Zehnder modulator, (d) a second Mach-Zehnder modulator; (e) a first branching waveguide optically coupling the main input port to the first Mach-Zehnder modulator and the second Mach-Zehnder modulator, (f) a first driver circuit connected to the first Mach-Zehnder modulator, the first driver circuit generating a first drive signal having a first amplitude at a first bias point; and (g) a second driver circuit connected to the second Mach-Zehnder modulator, the second driver circuit generating a second drive signal having a second amplitude at a second bias point. The first drive signal and the second drive signal satisfy at least one of a first condition and a second condition. The first condition is that the first amplitude differs from the second amplitude, and the second condition is that the first bias point differs from the second bias point.

In this optical modulator, the first driver circuit generates the first drive signal so as to satisfy at least one of the first and second conditions. When the intensity of light input to the first MZ modulator differs from the intensity of light input to the second MZ modulator in the integrated optical modulator, the first driver circuit and the second driver circuit is used to perform an adjustment such that the intensity of modulated light output from the first MZ modulator matches the intensity of modulated light output from the second MZ modulator. This adjustment is performed during manufacture, after manufacture, before use, or during operation.

In the optical modulator according to the invention, the first Mach-Zehnder modulator may include a first arm waveguide, a second arm waveguide, a first optical coupler connected to the first arm waveguide and the second arm waveguide, and a second optical coupler connected to the first arm waveguide and the second arm waveguide. The second Mach-Zehnder modulator may include a first arm waveguide, a second arm waveguide, a first optical coupler connected to the first arm waveguide and the second arm waveguide, and a second optical coupler connected to the first arm waveguide and the second arm waveguide. The optical modulator may further include a second branching waveguide optically coupled to a first output port of the second optical coupler of the first Mach-Zehnder modulator and to a first output port of the second optical coupler of the second Mach-Zehnder modulator; a first monitor light output connected to a second output port of the second optical coupler of the first Mach-Zehnder modulator, and a second monitor light output connected to a second output port of the second optical coupler of the second Mach-Zehnder modulator. The second branching waveguide may include a first input port connected to the first Mach-Zehnder modulator, a second input port connected to the second Mach-Zehnder modulator, and an output port connected to the main output port.

This optical modulator outputs signal light at the main output port and driver-adjustment monitor light at the first and second monitor light outputs.

The optical modulator according to the invention may further include a $\pi/2$ phase shifter disposed between the first branching waveguide and the second MZ modulator or between the second branching waveguide and the first output port of the second optical coupler of the second MZ modulator. This optical modulator can shift the phase by $\pi/2$ in the MZ modulator.

The optical modulator according to the invention may further include a first photoelectric converter optically coupled to the first monitor light output; a second photoelectric converter optically coupled to the second monitor light output; and a signal processing circuit connected to the first driver circuit, the signal processing circuit receiving a first monitor signal from the first photoelectric converter and a second monitor signal from the second photoelectric converter. The signal processing circuit may include a difference circuit that generates a differential signal corresponding to a difference between the first monitor signal and the second monitor signal. In addition, the first driver circuit may generate the first drive signal depending on the differential signal.

In the optical modulator according to the invention, the first driver circuit may adjust the first amplitude based on the differential signal such that the first Mach-Zehnder modulator outputs a modulated light having an intensity equal to an intensity of a modulated light output from the second Mach-Zehnder modulator.

In the optical modulator according to the invention, the first driver circuit may adjust the first bias point by changing a bias voltage based on the differential signal such that the first Mach-Zehnder modulator outputs a modulated light having an intensity equal to an intensity of a modulated light output from the second Mach-Zehnder modulator.

In the optical modulator according to the invention, the first Mach-Zehnder modulator preferably includes a phase adjustment electrode, and the second Mach-Zehnder modulator preferably includes a phase adjustment electrode. The optical modulator may further include a first phase adjustment circuit connected to the phase adjustment electrode of the first Mach-Zehnder modulator; and a second phase adjustment circuit connected to the phase adjustment electrode of the second Mach-Zehnder modulator. The first phase adjustment circuit preferably receives the first monitor signal from the first photoelectric converter and generates a first phase adjustment signal from the first monitor signal. In addition, a second phase adjustment circuit preferably receives the second monitor signal from the second photoelectric converter and generates a second phase adjustment signal from the second monitor signal.

In the optical modulator according to the invention, the first driver circuit may include a first bias circuit that sets the first bias point and a first amplification circuit that sets the first amplitude. In addition, the second driver circuit may include a second bias circuit that sets the second bias point and a second amplification circuit that sets the second amplitude.

In the optical modulator according to the invention, the first Mach-Zehnder modulator may include a first arm waveguide and a second arm waveguide. The first arm waveguide of the first Mach-Zehnder modulator may have an electrode that is connected to the first driver circuit. The second arm waveguide of the first Mach-Zehnder modulator may have an electrode that is grounded. The second Mach-Zehnder modulator may include a first arm waveguide and a second arm waveguide. The first arm waveguide of the second Mach-Zehnder modulator may have an electrode that is connected to the second driver circuit. In addition, the second arm waveguide of the second Mach-Zehnder modulator may have an electrode that is grounded.

In the optical modulator according to the invention, the first Mach-Zehnder modulator may include a first arm waveguide and a second arm waveguide. The first driver circuit may include a differential amplifier driving the first arm waveguide and the second arm waveguide of the first Mach-Zehnder modulator depending on a differential signal. The second Mach-Zehnder modulator may include a first arm waveguide and a second arm waveguide. In addition, and the second driver circuit may include a differential amplifier driving the first arm waveguide and the second arm waveguide of the second Mach-Zehnder modulator depending on a differential signal. Furthermore, the first Mach-Zehnder modulator, the second Mach-Zehnder modulator, and the first branching waveguide are preferably disposed on a single substrate.

BRIEF DESCRIPTION OF THE DRAWINGS

FIGS. 2A to 2D illustrate the amplitudes and phases of modulated signals in an optical modulator in which the intensity of light input to a first MZ modulator is equal to the intensity of light input to a second MZ modulator.

FIGS. 4A to 4C illustrate the adjustment of the amount of phase modulation depending on the amplitude of a drive signal applied to one MZ modulator in the optical modulator.

FIGS. 6A to 6F illustrate a method for adjusting an optical signal constellation by increasing the amount of phase shift to change the amplitude of a drive signal.

FIGS. 7A to 7F illustrate a method for adjusting an optical signal constellation by decreasing the amount of phase shift to change the amplitude of a drive signal.

DESCRIPTION OF THE PREFERRED EMBODIMENTS

Figure 1:
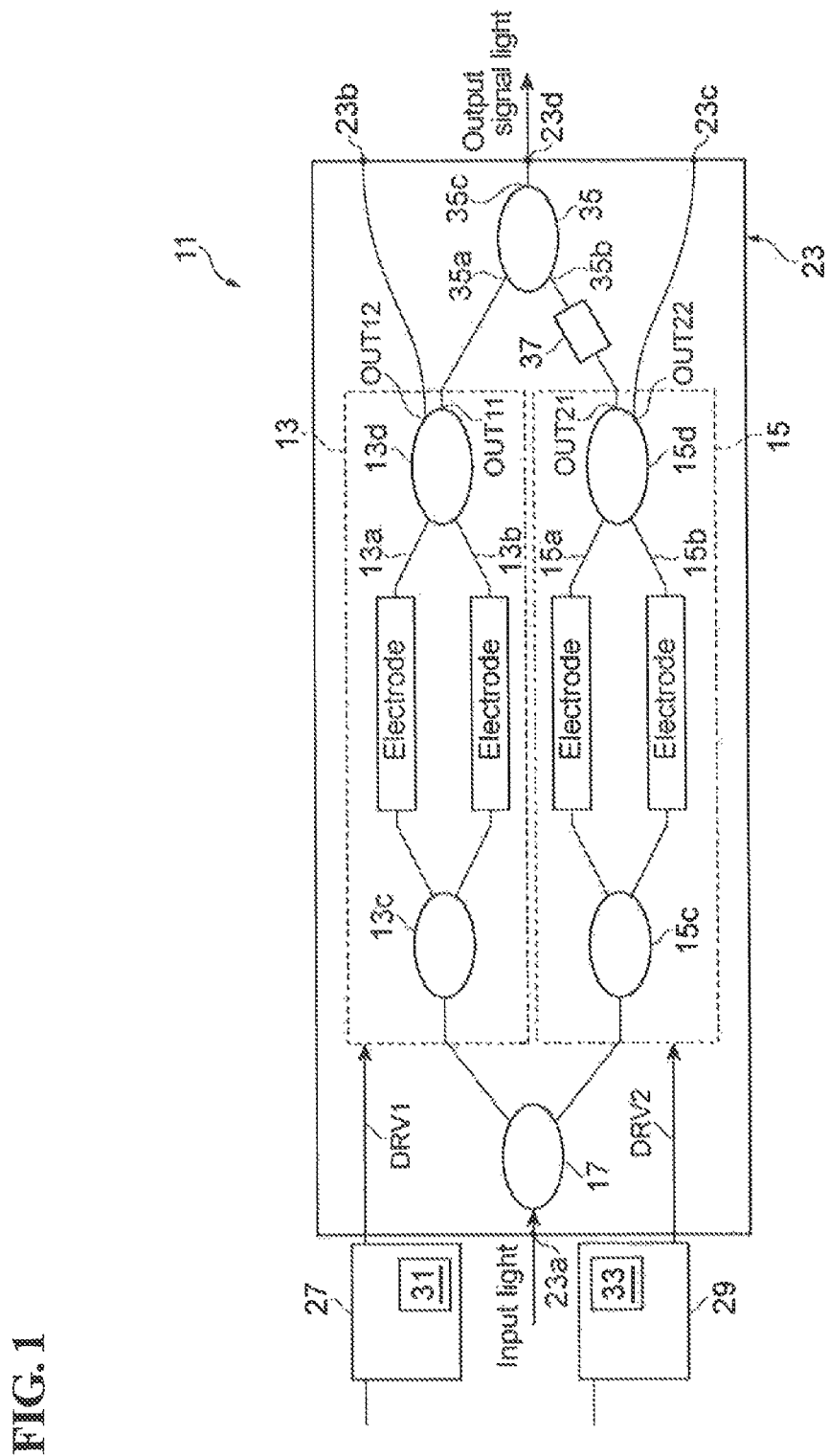
FIG. 1 illustrates an optical modulator according to an embodiment of the present invention.

Next, optical modulators according to embodiments of the present invention will now be described with reference to the accompanying drawings. Where possible, like parts are indicated by like reference numerals.

FIG. 1 illustrates an optical modulator according to an embodiment of the present invention. An optical modulator 11 includes a first MZ modulator 13, a second MZ modulator 15, a first branching waveguide 17, a first driver circuit 27, and a second driver circuit 29. The first MZ modulator 13, the second MZ modulator 15, and the first branching waveguide 17 constitute an integrated optical modulator 23. The first MZ modulator 13, the second MZ modulator 15, and the first branching waveguide 17 are disposed on a semiconductor substrate 25. The first branching waveguide 17 is optically coupled to the first MZ modulator 13 and the second MZ modulator 15. The first driver circuit 27 is connected to an electrode of the first MZ modulator 13. The second driver circuit 29 is connected to an electrode of the second MZ modulator 15. The first branching waveguide 17 optically couples an input port 23a of the integrated optical modulator 23 to the first MZ modulator 13 and the second MZ modulator 15. In the embodiment, the input port 23a of the integrated optical modulator 23 is a main input port. The first driver circuit 27 generates a first drive signal DRV1 having a first amplitude at a first bias point. The second driver circuit 29 generates a second drive signal DRV2 having a second amplitude at a second bias point. For example, the first drive signal DRV1 generated by the first driver circuit 27 satisfies at least one of the following first and second conditions:

First condition: the first amplitude differs from the second amplitude.

Second condition: the first bias point differs from the second bias point.

In this optical modulator 11, the first driver circuit 27 generates the first drive signal DRV1 so as to satisfy at least one of the first and second conditions. Alternatively, the second driver circuit 29 may be configured to generate the second drive signal DRV2 so as to satisfy at least one of the first and second conditions. If the intensity of light input to the first MZ modulator 13 differs from the intensity of light input to the second MZ modulator 15, the first driver circuit 27 and the second driver circuit 29 is adjusted so that the intensity of modulated light output from the first MZ modulator 13 and the intensity of modulated light output from the second MZ modulator 15 are equal to each other. This adjustment is performed during manufacture, after manufacture, before use, or during operation. The first MZ modulator 13 and the second MZ modulator 15 are made of, for example, an InP-based semiconductor. If the integrated optical modulator 23 is made of semiconductors, the semiconductor substrate 25 is made of, for example, semi-insulating InP. The semiconductor waveguides include, for example, an n-type InP cladding layer, a core layer having a multi-quantum-well (MQW) structure, and a p-type InP cladding layer formed on the semiconductor substrate 25. The multi-quantum-well (MQW) structure is made of, for example, InGaAsP well layers and InP barrier layers which are alternately stacked.

The first driver circuit 27 includes a circuit 31 for generating the first drive signal DRV1 so as to satisfy at least one of the first and second conditions. The circuit 31 includes a direct-current (DC) voltage source with which the first driver circuit 27 generates a signal satisfying the first condition or a DC voltage source with which the first driver circuit 27 generates a signal satisfying the second condition.

Alternatively, the second driver circuit 29 includes a circuit 33 for generating the second drive signal DRV2 so as to satisfy at least one of the first and second conditions. The circuit 33 includes a DC voltage source with which the second driver circuit 29 generates a signal satisfying the first condition or a DC voltage source with which the second driver circuit 29 generates a signal satisfying the second condition.

In the integrated optical modulator 23, the first MZ modulator 13 includes a first arm waveguide 13a, a second arm waveguide 13b, a first optical coupler 13c, and a second optical coupler 13d. The first optical coupler 13c is connected to one end of the first arm waveguide 13a and to one end of the second arm waveguide 13b. The second optical coupler 13d is connected to the other end of the first arm waveguide 13a and to the other end of the second arm waveguide 13b. The second MZ modulator 15 includes a first arm waveguide 15a, a second arm waveguide 15b, a first optical coupler 15c, and a second optical coupler 15d. The first optical coupler 15c is connected to one end of the first arm waveguide 15a and to one end of the second arm waveguide 15b. The second optical coupler 15d is connected to the other end of the first arm waveguide 15a and to the other end of the second arm waveguide 15b. The optical modulator 11 includes a second branching waveguide 35. The second branching waveguide 35 is disposed on the semiconductor substrate 25 and is optically coupled to a first output port OUT11 of the second optical coupler 13d of the first MZ modulator 13 and to a first output port OUT21 of the second optical coupler 15d of the second MZ modulator 15. A second output port OUT12 of the second optical coupler 13d of the first MZ modulator 13 is connected to a first monitor light output 23b of the integrated optical modulator 23. A second output port OUT22 of the second optical coupler 15d of the second MZ modulator 15 is connected to a second monitor light output 23c of the integrated optical modulator 23. The second branching waveguide 35 includes a first input port 35a, a second input port 35b, and an output port 35c. The first input port 35a of the second branching waveguide 35 is connected to the first MZ modulator 13. The second input port 35b of the second branching waveguide 35 is connected to the second MZ modulator 15. The output port 35c is connected to a main light output 23d of the integrated optical modulator 23. This optical modulator 11 outputs signal light at the main light output 23d and driver-adjustment monitor light at the monitor outputs 23b and 23c. In the embodiment, the main light output 23d of the integrated optical modulator 23 is a main output port.

The optical modulator 11 may further include a π/2 phase shifter 37. The π/2 phase shifter 37 is disposed between the second branching waveguide 35 and the first output port OUT21 of the second optical coupler 15d of the second MZ modulator 15. This optical modulator 11 can shift the phase of the signal light by π/2 in the integrated optical modulator 23. Alternatively, the π/2 phase shifter 37 may be disposed between the first branching waveguide 17 and the first optical coupler 15c of the second MZ modulator 15 (see FIGS. 2A and 3A).

This optical modulator 11 is applicable to, for example, quadrature phase-shift keying (QPSK) modulation systems.

The influence of a mismatch in light intensity between the optical signals output from the two MZ modulators 13 and 15 in the optical modulator 11 will now be described with reference to FIGS. 2A to 2D and 3A to 3D.

FIGS. 2A to 2D illustrate the amplitudes and phases of modulated signals in an optical modulator 41. In FIGS. 2A to 2D, the intensity of light input to a first MZ modulator 43 is equal to the intensity of light input to a second MZ modulator 45. As shown in FIG. 2A, the first MZ modulator 43 and the second MZ modulator 45 receive input light through a branching waveguide 47. The branching waveguide 47 has a branching ratio of 1:1. The optical signal modulated by the first MZ modulator 43 is referred to as "I signal". The optical signal modulated by the second MZ modulator 45 is referred to as "Q signal". In FIG. 2A, a π/2 phase shifter 37 is disposed between the first branching waveguide 47 and the first optical coupler of the second MZ modulator 45. FIGS. 2B and 2C show the phases and amplitudes of the two modulated optical signals, i.e., the I signal and the Q signal, propagating through the first MZ modulator 43 and the second MZ modulator 45, respectively, of the optical modulator 41 shown in FIG. 2A. In FIGS. 2B to 2D, the horizontal axis indicates the amplitude of the I signal, and the vertical axis indicates the amplitude of the Q signal. For example, in FIG. 2B, the angle $\theta_A$ between the horizontal axis and a line connecting the origin and a certain point (point A) on the circle indicates the amount of phase shift of the I signal. The line on the horizontal axis (the radius of the circle) indicates the amplitude of the light (I signal) output from the first MZ modulator 43. Similarly, in FIG. 2C, the angle $\theta_B$ between the horizontal axis and a line connecting the origin and a certain point (point B) on the circle indicates the amount of phase shift of the Q signal. The line on the vertical axis (the radius of the circle) indicates the amplitude of the light (Q signal) output from the second MZ modulator 45. FIG. 2D shows signal symbols specified by the amplitudes and phases of the I signal and the Q signal.

FIG. 2B shows the phases of the light propagating through the first arm waveguide and the light propagating through the second arm waveguide in the first MZ modulator 43, and the amplitude of the light output through the second optical coupler which couples together the light propagating through the first arm waveguide and the light propagating through the second arm waveguide in the first MZ modulator 43. FIG. 2C shows the phases of the light propagating through the first arm waveguide and the light propagating through the second arm waveguide in the second MZ modulator 45, and the amplitude of the light output through the second optical coupler which couples together the light propagating through the first arm waveguide and the light propagating through the second arm waveguide in the second MZ modulator 45. Because the branching waveguide 47 has a branching ratio of 1:1, the amplitude of the optical signal modulated by the first MZ modulator 43, i.e., the I signal, is equal to the amplitude of the optical signal modulated by the second MZ modulator 45, i.e., the Q signal. Thus, as shown in FIG. 2D, the signal symbols specified by the amplitudes and phases of the I signal and the Q signal are located at regular intervals on the circle.

Figure 3A:
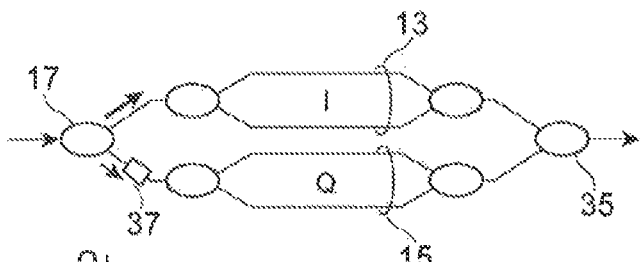
FIGS. 3A to 3D illustrate the amplitudes and phases of modulated signals in an optical modulator in which the intensity of light input to a first MZ modulator differs from the intensity of light input to a second MZ modulator.
Figure 3B:
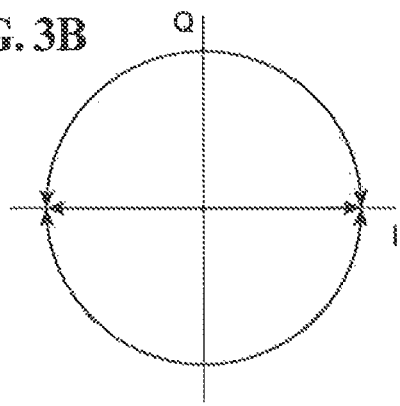
Figure 3D:
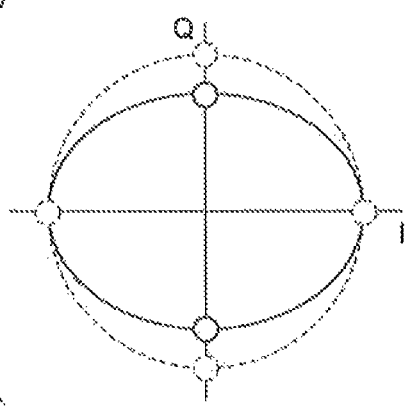
Figure 3C:
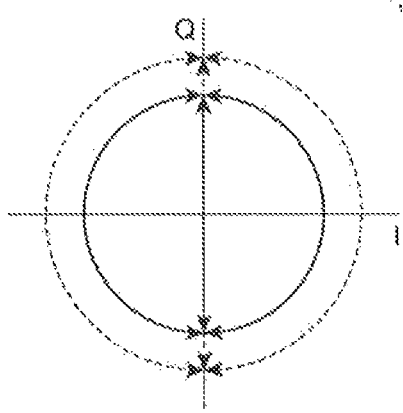

FIGS. 3A to 3D illustrate the amplitudes and phases of modulated signals in the optical modulator 11. In FIGS. 3A to 3D, the intensity of the light input to the first MZ modulator 13 differs from the intensity of the light input to the second MZ modulator 15. As shown in FIG. 3A, the first MZ modulator 13 and the second MZ modulator 15 receive input light through the first branching waveguide 17. As in FIGS. 2A to 2D, the optical signal modulated by the first MZ modulator 13 is referred to as "I signal". The optical signal modulated by the second MZ modulator 15 is referred to as "Q signal". In FIG. 3A, the π/2 phase shifter 37 is disposed between the first branching waveguide 17 and the first optical coupler 15c of the second MZ modulator 15. In FIGS. 3B to 3D, the horizontal axis indicates the amplitude of the I signal, and the vertical axis indicates the amplitude of the Q signal. In FIG. 3B, the angle between the horizontal axis and a line connecting the origin and a certain point on the circle indicates the amount of phase shift of the I signal. The line on the horizontal axis (the radius of the circle) indicates the amplitude of the light (I signal) output from the first MZ modulator 13. Similarly, in FIG. 3C, the angle between the horizontal axis and a line connecting the origin and a certain point on the circle indicates the amount of phase shift of the Q signal. The line on the vertical axis (the radius of the circle) indicates the amplitude of the light (Q signal) output from the second MZ modulator 15. FIG. 3D shows signal symbols specified by the amplitudes and phases of the I signal and the Q signal. The first branching waveguide 17 has a branching ratio of, for example, (1+α):(1−α).

FIG. 3B shows the phases of the light propagating through the first arm waveguide 13a and the light propagating through the second arm waveguide 13b in the first MZ modulator 13, and the amplitude of the light output through the second optical coupler 13d which couples together the light propagating through the first arm waveguide 13a and the light propagating through the second arm waveguide 13b in the first MZ modulator 13. FIG. 3C shows the phases of the light propagating through the first arm waveguide 15a and the light propagating through the second arm waveguide 15b in the second MZ modulator 15, and the amplitude of the light output through the second optical coupler 15d which couples together the light propagating through the first arm waveguide 15a and the light propagating through the second arm waveguide 15b in the second MZ modulator 15. The first branching waveguide 17 does not have a branching ratio of 1:1; therefore, as shown in FIG. 3B, the amplitude of the optical signal modulated by the first MZ modulator 13, i.e., the I signal, is slightly larger than the ideal amplitude. Conversely, as shown in FIG. 3C, the amplitude of the optical signal modulated by the second MZ modulator 15, i.e., the Q signal, is slightly smaller than the amplitude of the I signal indicated by the dashed line. Thus, as shown in FIG. 3D, not all of the signal symbols specified by the amplitudes and phases of the I signal and the Q signal are located on the circle (indicated by the dashed line). In this case, the amplitudes of the signal symbols for the Q signal are smaller because the light input to the second MZ modulator 15 has a lower optical intensity.

FIGS. 4A to 4C illustrate the adjustment of the amount of phase modulation (I signal) depending on the amplitude of the drive signal applied to one MZ modulator (for example, the first MZ modulator 13) in the optical modulator 11. In FIGS. 4A to 4C and 5A to 5C, the angle θ indicates the amount of phase modulation of the light in the arm waveguides. The angle θ indicates the optical phase difference between the arm waveguides, with the drive signal being zero. FIG. 4A shows the relationship between the applied voltage and the normalized light output power of InP-based semiconductor waveguides for light with different wavelengths (i.e., 1,530 nm, 1,540 nm, 1,550 nm, and 1,560 nm). In FIGS. 4A to 4C, the InP-based semiconductor waveguide includes an n-InP layer, a MQW structure composed of InGaAsP quantum well layers and InP barrier layers, and an n-InP layer that are stacked in the above order on an InP substrate. "Bar" indicates the light output from one port of one MZ modulator in the optical modulator 11. "Cross" indicates the light output from the other port of the MZ modulator in the optical modulator 11. FIG. 4A shows a potential difference Vπ that corresponds to the difference of the voltage amplitude to be applied to the MZ modulator in order to obtain an amount of phase modulation of π (an angle of 180°). This graph suggests that the amount of phase modulation in the phase modulation waveguide increases as the voltage amplitude applied to the phase modulation waveguide is increased, with the bias voltage being fixed. Accordingly, the modulation amplitude of the light output intensity of the modulator increases. Referring to FIG. 4A, "amplitude state A" (for example, the voltage amplitude before adjustment) and "amplitude state B" (for example, the voltage amplitude after adjustment) are shown for the same bias voltage. As shown in FIG. 4A, the light output power is changed by changing the voltage amplitude of the drive signal. Thus, for example, a drive signal having a different voltage amplitude from that of the drive signal applied to the arm waveguides of the second MZ modulator 15 is applied to the arm waveguides of the first MZ modulator 13. As a result, the optical power of the modulated optical signal from the first MZ modulator 13 is adjusted so as to be equal to the optical power of the modulated optical signal from the second MZ modulator 15.

FIG. 4B shows the amount of phase modulation and the signal amplitude in amplitude state A. FIG. 4C shows the amount of phase modulation and the signal amplitude in amplitude state B. The horizontal axis in FIGS. 4B and 4C indicates the amplitude of the I signal, and the angle around the origin indicates the phase angle of the I signal. The signal amplitude of the optical signal in amplitude state B is larger than the signal amplitude of the optical signal in amplitude state A. The amount of phase modulation of the optical signal in amplitude state B is larger than the amount of phase modulation of the optical signal in amplitude state A. In this example, the amount of phase modulation of the optical signal in amplitude state B is π, and the signal amplitude in amplitude state B is Vπ.

In the case illustrated in FIGS. 4A to 4C, the signal amplitude in amplitude state B is Vπ. Thus, amplitude state A is considered to be the state before adjustment, and amplitude state B is considered to be the state after adjustment. Although the I signal has been described with reference to FIGS. 4A to 4C, this description also applies to the adjustment of the amount of phase modulation (Q signal) depending on the amplitude of the drive signal applied to the other MZ modulator (for example, the second MZ modulator 15) in the optical modulator 11.

Figure 5A:
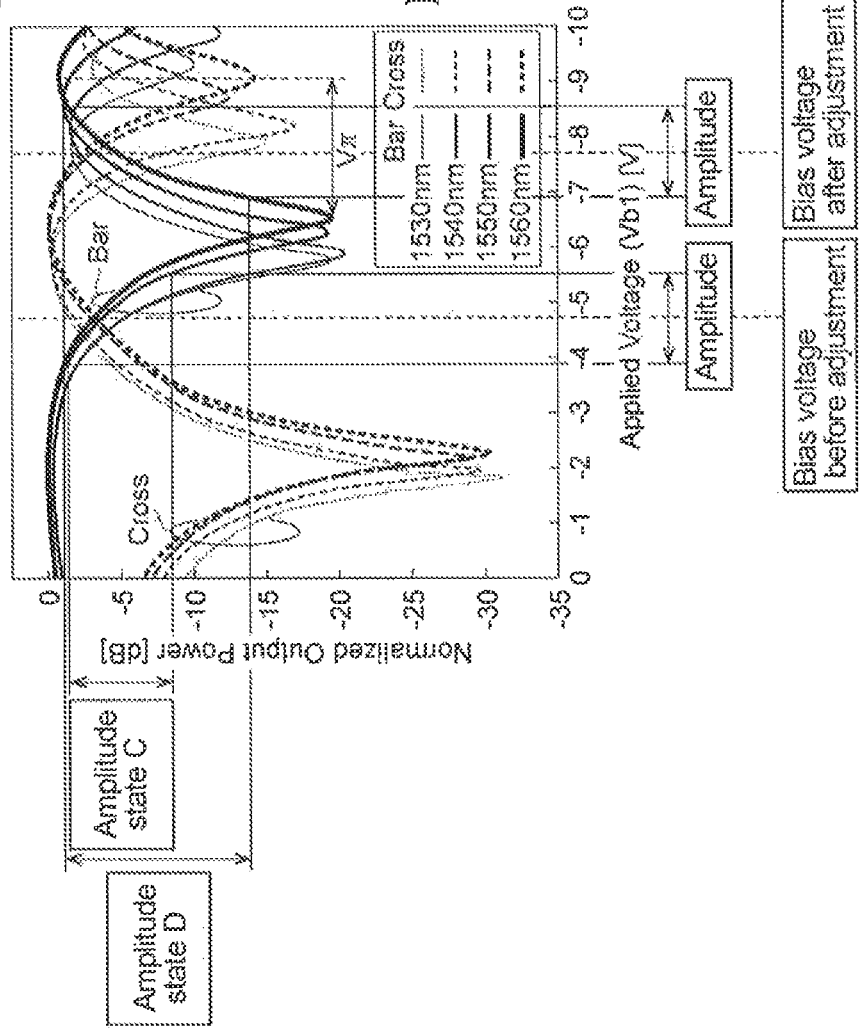
FIGS. 5A to 5C illustrate the adjustment of the amount of phase modulation depending on the bias voltage applied to one MZ modulator in the optical modulator.
Figure 5B:
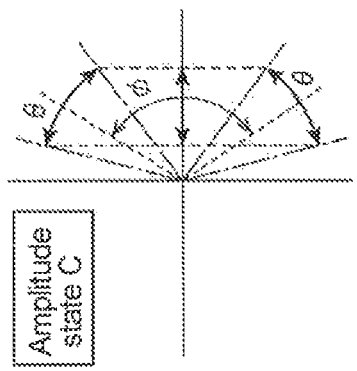
Figure 5C:
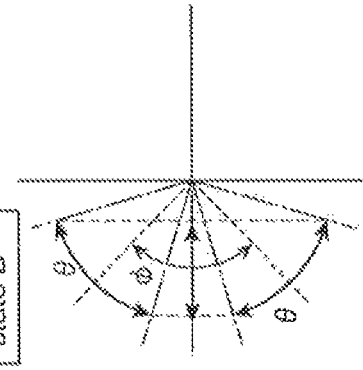

FIGS. 5A to 5C illustrate the adjustment of the amount of phase modulation by adjusting the bias voltage. FIG. 5A shows the relationship between the applied voltage and the normalized light output power of InP-based semiconductor waveguides for light with different wavelengths (i.e., 1,530 nm, 1,540 nm, 1,550 nm, and 1,560 nm). FIG. 5A shows a potential difference Vπ that corresponds to the difference of the voltage amplitude to be applied to the MZ modulator in order to obtain an amount of phase modulation of π (an angle of 180°). This graph suggests that the amount of phase modulation in each phase modulation waveguide increases, and accordingly the signal amplitude of the optical intensity at the modulator output increases. Because the bias voltage applied to the signal electrode is changed, the phase difference between the two waveguides that constitute the MZ modulator deviates from the desired level that is, for example, the phase π at which the drive signal is zero. However, this deviation in phase is adjusted by feedback control of the voltage applied to a phase adjustment electrode. The phase adjustment electrode is provided in addition to the signal electrode. A change in the bias voltage applied to the optical waveguides results in a change in the phase of the modulated optical signal. Referring to FIG. 5A, "bias state C" (for example, the bias voltage before adjustment) and "bias state D" (for example, the bias voltage after adjustment) for the same voltage amplitude are shown. As shown in FIG. 5A, the light output power is changed by changing the bias voltage of the drive signal. Thus, for example, a drive signal having a different bias voltage from that of the drive signal applied to the arm waveguides of the second MZ modulator 15 is applied to the arm waveguides of the first MZ modulator 13. As a result, the optical power of the modulated optical signal from the first MZ modulator 13 is adjusted so as to be equal to the optical power of the modulated optical signal from the second MZ modulator 15. In this example, the amount of phase modulation of the optical signal at the signal amplitude in bias states C and D is smaller than π. Thus, the amount of phase modulation in the generation of a phase-modulated optical signal does not need to be π, but as in this example, may be set to be lower than A. Although a change in the bias voltage applied to the optical waveguides results in a change in the phase of the modulated optical signal, this change in phase can be estimated from design and assessment. Based on this estimation, the voltage applied to the phase adjustment electrode on the arm electrode can be adjusted to achieve the desired optical signal constellation.

As described above, the optical signal is adjusted depending on at least one of the voltage amplitude and the bias voltage of the drive signal. For such adjustment of the optical signal, for example, the first driver circuit 27 and the second driver circuit 29 include the adjustment circuit 31 and the adjustment circuit 33, respectively, shown in FIG. 1. The adjustment circuit 31 includes, for example, an amplifier for setting the signal amplitude of the first MZ modulator 13 and/or a voltage source for setting the bias voltage of the first MZ modulator 13. The adjustment circuit 33 includes, for example, an amplifier for setting the signal amplitude of the second MZ modulator 15 and/or a voltage source for setting the bias voltage of the second MZ modulator 15. The circuits 31 and 33 are used to perform an adjustment such that the intensity of the modulated light output from the first MZ modulator 13 matches the intensity of the modulated light output from the second MZ modulator 15.

As can be seen from FIGS. 4A to 4C and 5A to 5C and the above description, the power of the modulated optical signal can be changed by changing the amplitude and/or the bias voltage of the drive signal.

A method for adjusting the optical signal constellation by changing the amplitude of the drive signal will now be described with reference to FIGS. 6A to 6F. Referring to FIGS. 6A and 6B, the adjustment of the optical signal constellation of an optical modulator in which the Q signal has a lower optical power than the I signal, as in the modulator shown in FIGS. 3A to 3D, will be described.

As indicated by arrow BF1 in FIG. 6B, the signal light of the Q signal modulated in proportion to the intensity of the input light has a smaller amplitude. Thus, as indicated by the solid line in FIG. 6C, the Q signal output from the multi-level optical phase modulator has a lower intensity than the I signal output from the multi-level optical phase modulator. This results in distortion in the modulated optical signal. Accordingly, as indicated by arrow AF1 in FIGS. 6B and 6E, the amount of phase modulation in the MZ modulator is increased. This increases the modulation amplitude of the optical signal in the range smaller than the phase π. As shown in FIG. 6D, the amplitude of the drive signal for the I signal does not need to be changed. As indicated by arrow AF1 in FIG. 6E, as the amount of phase modulation in the MZ modulator is increased, the modulation amplitude of the optical signal increases correspondingly. That is, the amount of phase modulation of the Q signal in the MZ modulator is adjusted such that the modulation amplitude of the Q signal is equal to the modulation amplitude of the I signal. As shown in FIG. 6F, the thus-adjusted optical modulator can generate a high-quality signal without distortion between the I signal and the Q signal.

Although an adjustment that increases the amount of phase modulation of the Q signal has been described herein, an adjustment that decreases the phase adjustment of the I signal may be performed instead. In this case, the target amount of phase shift is it.

As indicated by arrow BF2 in FIG. 7A, the signal light of the I signal modulated in proportion to the intensity of the input light has a larger amplitude. The Q signal modulated in proportion to the intensity of the input light has a smaller amplitude than the I signal, shown in FIG. 7B. As indicated by the solid line in FIG. 7C, the I signal output from the multi-level optical phase modulator has a higher intensity than the Q signal output from the multi-level optical phase modulator. This results in distortion in the modulated optical signal. Accordingly, as indicated by arrows BF2 and AF2 in FIGS. 7A and 7D, the amount of phase modulation in the MZ modulator is decreased. As shown in FIG. 7D, this results in a decrease in the amplitude of the drive signal for the I signal. As shown in FIG. 7E, the amount of phase modulation of the Q signal does not need to be changed. As indicated by arrow AF2 in FIG. 7D, as the amount of phase modulation in the MZ modulator is decreased, the modulation amplitude of the optical signal decreases correspondingly. That is, the amount of phase modulation of the Q signal in the MZ modulator is adjusted such that the modulation amplitude of the Q signal is equal to the modulation amplitude of the I signal. As shown in FIG. 7F, the thus-adjusted optical modulator can generate a high-quality signal without distortion between the I signal and the Q signal.

A control mechanism is provided that adjusts the voltage amplitude and/or the bias voltage of the drive signal using the output signal light or signal light from additional monitor outputs such that the I signal and the Q signal have equal modulation amplitudes.

Figure 8:
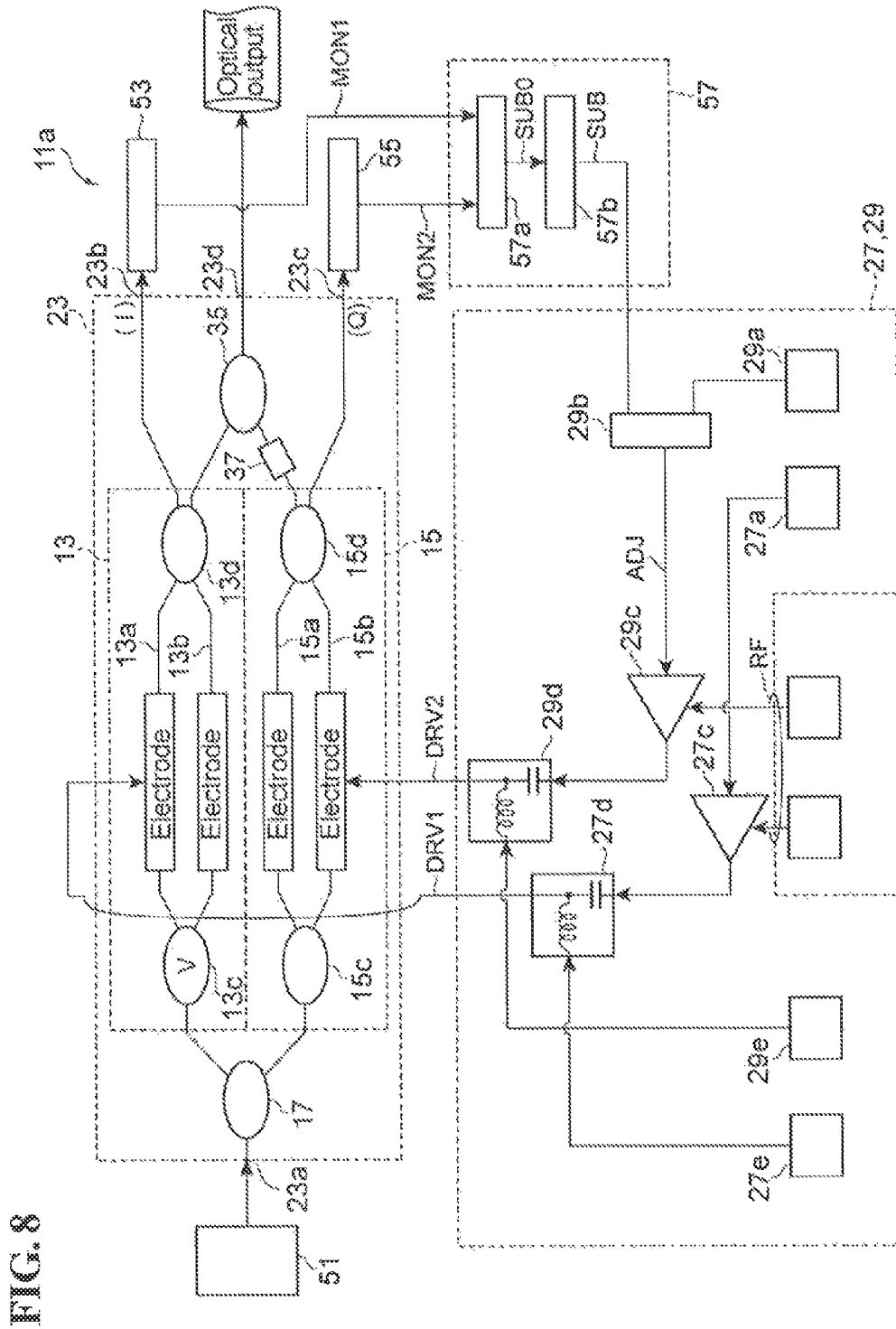
FIG. 8 illustrates an example of an optical modulator.

FIG. 8 illustrates an example of an optical modulator. An optical modulator 11a includes a first photoelectric converter 53, a second photoelectric converter 55, a signal processing circuit 57, and a light source 51. The first photoelectric converter 53 and the second photoelectric converter 55 include, for example, waveguide-type pin photodiodes (pin-PDs). The first photoelectric converter 53 is optically coupled to the first monitor light output 23b. The second photoelectric converter 55 is optically coupled to the second monitor light output 23c. The signal processing circuit 57 receives a first monitor signal MON1 from the first photoelectric converter 53 and a second monitor signal MON2 from the second photoelectric converter 55. The signal processing circuit 57 is connected to the second driver circuit 29. The signal processing circuit 57 includes a difference circuit 57a that generates a first differential signal SUB0 corresponding to the difference between the first monitor signal MON1 and the second monitor signal MON2. The first differential signal SUB0 indicates the difference in intensity between the monitor light from the first monitor light output 23b and the monitor light from the second monitor light output 23c. That is, the first differential signal SUB0 indicates the difference in optical power between the modulated light from the first MZ modulator 13 and the modulated light from the second MZ modulator 15. If necessary, the signal processing circuit 57 includes a square operation circuit 57b. The square operation circuit 57b operates to square the signal SUB0 output from the upstream difference circuit 57a. The signal processing circuit 57 feeds a second differential signal (control signal) SUB to the second driver circuit 29. The second differential signal (control signal) SUB and a signal from a second bias circuit (driver-adjustment DC voltage source) 29a are fed to and added together by an adder 29b. The adder 29b generates a third differential signal (instruction signal) ADJ and feeds it to a second amplification circuit 29c such that the second differential signal (control signal) SUB is adjusted to a predetermined level (in this example, zero). That is, the adder 29b feeds the third differential signal (instruction signal) ADJ to the second amplification circuit 29c such that the two MZ modulators 13 and 15 have equal optical amplitudes. The second amplification circuit 29c receives the third differential signal ADJ and a radiofrequency signal RF and drives a second bias tee circuit 29d. The second bias tee circuit 29d includes an inductor and a capacitor. In the second bias tee circuit 29d, an end of the inductor is connected to a second bias circuit (second bias DC voltage source) 29e, and an end of the capacitor is connected to the second amplification circuit 29c. The other end of the inductor and the other end of the capacitor are connected together to the output of the second driver circuit 29. The second bias tee circuit 29d generates an RF drive signal DRV2 based on the signal from the second amplification circuit 29c. The first driver circuit 27 includes a first bias circuit 27a, a first amplification circuit 27c, a first bias tee circuit 27d, and a first bias DC voltage source (first bias circuit) 27e and generates an RF drive signal DRV1. In this example, the bias voltage of the first bias circuit 27e is set to be equal to the bias voltage of the second bias circuit 29e. Thus, the first driver circuit 27 includes the first bias circuit 27e, which sets the bias point of the RF drive signal DRV1, and the first amplification circuit 27c, which sets the signal amplitude of the RF drive signal DRV1. The second driver circuit 29 includes the second bias circuit 29e, which sets the bias point of the RF drive signal DRV2, and the second amplification circuit 29c, which sets the signal amplitude of the RF drive signal DRV2. The second amplification circuit 29c receives the third differential signal (instruction signal) ADJ generated by the adder 29b from the second differential signal (control signal) SUB and the signal from the second bias circuit (driver-adjustment DC voltage source) 29a. The first amplification circuit 27c receives a signal from the first bias circuit 27a. Thus, the RF drive signals DRV1 and DRV2 applied to the first MZ modulator 13 and the second MZ modulator 15 have different amplitudes. In particular, the amplitude of the RF drive signal DRV2 is adjusted depending on the third differential signal (instruction signal) ADJ. The bias voltages of the first bias circuit 27e and the second bias circuit 29e are set to be equal. Thus, the RF drive signals DRV1 and DRV2 applied to the first MZ modulator 13 and the second MZ modulator 15 have equal bias voltages. The amplitudes of the RF drive signals DRV1 and DRV2 can be controlled to reduce distortion in the optical signal. In this example, the second driver circuit 29 (at least one of the first driver circuit 27 and the second driver circuit 29) adjusts the signal amplitude such that the intensity of the modulated light output from the first MZ modulator 13 matches the intensity of the modulated light output from the second MZ modulator 15. The control in the driver circuits 27 and 29 is performed by continuous feedback during operation. Alternatively, a central processing unit (CPU) may receive the second differential signal (control signal) SUB data from the signal processing circuit 57 and control the adder 29b to generate the third differential signal (instruction signal) ADJ. Specifically, a memory device stores in advance a virtual second differential signal (control signal) SUB data array and a DC power supply voltage control data array for generating the third differential signal (instruction signal) ADJ based on each virtual second differential signal (control signal) SUB data item. The second differential signal (control signal) SUB data from the signal processing circuit 57 is input to the CPU. The CPU refers to the second differential signal (control signal) SUB data and the virtual second differential signal (control signal) SUB data array stored in the memory device and retrieves a DC power supply voltage control value for generating a predetermined third differential signal (instruction signal) ADJ. The CPU then feeds the DC power supply voltage control value to the driver-adjustment DC voltage source 29a, which is connected to one input of the adder 29b, to generate the desired third differential signal (instruction signal) ADJ. Thus, the third differential signal (instruction signal) ADJ is generated depending on the second differential signal (control signal) SUB from the signal processing circuit 57. As a result, the amplitude of the RF drive signal DRV2 is adjusted.

In this example, the voltage amplitude at which the QPSK modulator is driven is controlled, for example, feedback-controlled, such that the I signal and the Q signal have equal output intensities. In the QPSK modulator, the monitor output light of the I signal and the monitor output light of the Q signal branched off aside from the main output are converted into voltage signals by the photoelectric converters 53 and 55, which average a high-speed RF signal over time (for example, at a time constant of 5 ns). Zero convergence voltage control is then performed such that the difference in light output intensity between the I signal and the Q signal determined by the difference circuit 57a is zero, in practice, sufficiently low. In this manner, the voltage amplitude applied to the signal electrode for the Q signal is controlled by the second driver circuit 29. The second driver circuit 29 adjusts the voltage amplitude of the RF drive signal DRV2 depending on the voltage output from the adder 29b (third differential signal (instruction signal) ADJ). The RF drive signal DRV2 generated by the second driver circuit 29 is modulated in synchronization with an external RF signal.

Figure 9:
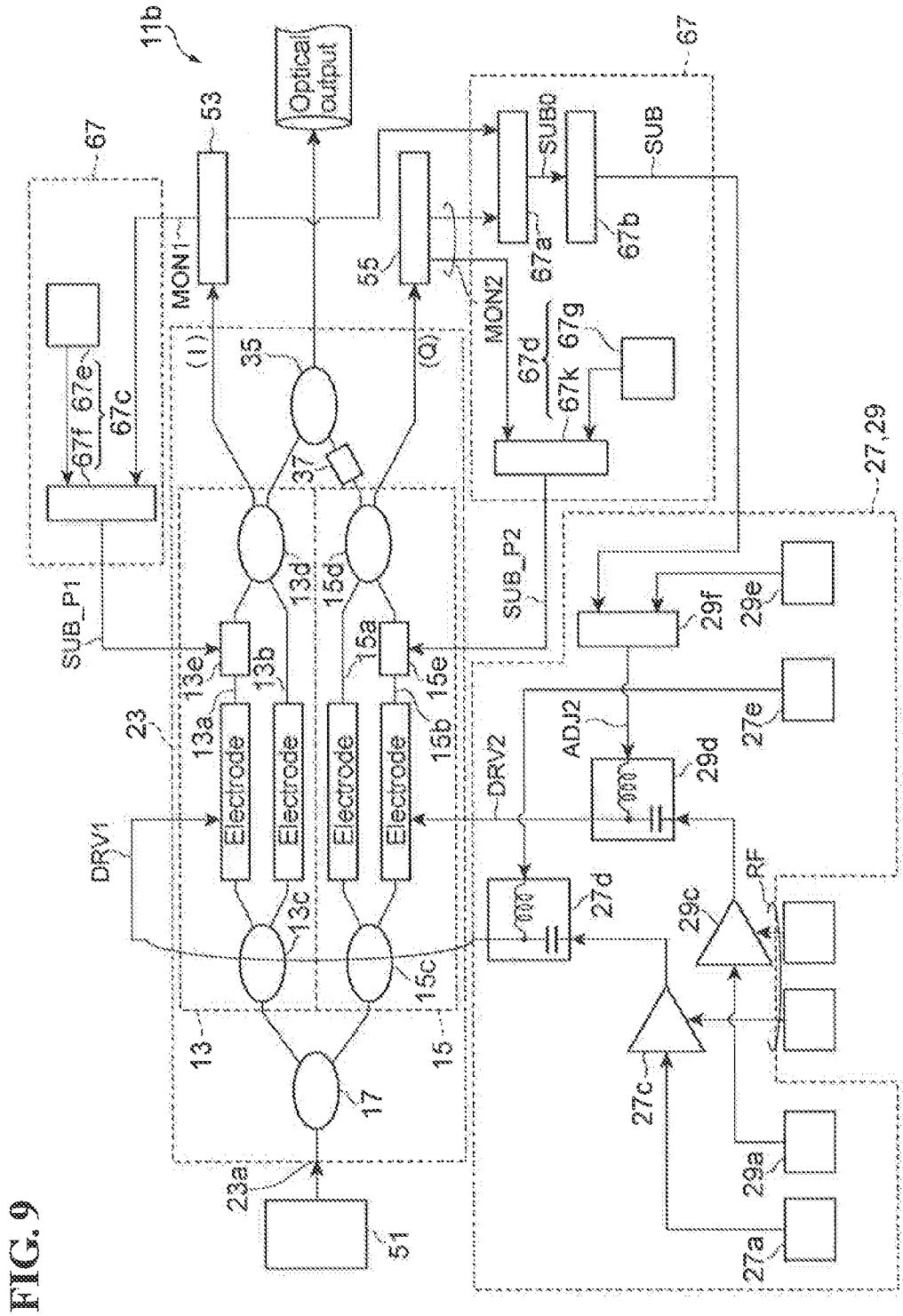
FIG. 9 illustrates another example of an optical modulator.

FIG. 9 illustrates an example of an optical modulator. An optical modulator 11b includes a first photoelectric converter 53, a second photoelectric converter 55, a signal processing circuit 67, and a light source 51. The signal processing circuit 67 receives a first monitor signal MON1 from the first photoelectric converter 53 and a second monitor signal MON2 from the second photoelectric converter 55. The signal processing circuit 67 is connected to the second driver circuit 29. The signal processing circuit 67 includes a difference circuit 67a that generates a first differential signal SUB0 corresponding to the difference between the first monitor signal MON1 and the second monitor signal MON2. The first differential signal SUB0 indicates the difference between the monitor light from the first monitor light output 23b and the monitor light from the second monitor light output 23c. That is, the first differential signal SUB0 indicates the difference in optical power between the modulated light from the first MZ modulator 13 and the modulated light from the second MZ modulator 15. If necessary, the signal processing circuit 67 includes a square operation circuit 67b. The square operation circuit 67b operates to square the signal SUB0 output from the upstream difference circuit 67a.

The signal processing circuit 67 includes a first phase adjustment circuit 67c and a second phase adjustment circuit 67d. The first phase adjustment circuit 67c feeds a first phase adjustment signal (control signal) to a first phase adjustment electrode 13e of the first MZ modulator 13. The second phase adjustment circuit 67d feeds a second phase adjustment signal (control signal) to a second phase adjustment electrode 15e of the second MZ modulator 15. The first phase adjustment circuit 67c generates a phase adjustment signal SUB_P1 for adjusting the phase of the modulated signal from the first monitor signal MON1. The first phase adjustment circuit 67c includes a phase-adjustment bias circuit (phase-adjustment DC voltage source) 67e and a difference circuit 67f. The difference circuit 67f generates a differential signal, i.e., the phase adjustment signal SUB_P1, from a signal from the phase-adjustment bias circuit 67e and the first monitor signal MON1 from the first photoelectric converter 53. The first phase adjustment electrode 13e receives the phase adjustment signal SUB_P1 from the difference circuit 67f. The second phase adjustment circuit 67d generates a phase adjustment signal SUB_P2 for adjusting the phase of the modulated signal from the second monitor signal MON2. The second phase adjustment circuit 67d includes a phase-adjustment bias circuit (phase-adjustment DC voltage source) 67g and a difference circuit 67k. The difference circuit 67k generates a differential signal, i.e., the phase adjustment signal SUB_P2, from a signal from the phase-adjustment bias circuit 67g and the second monitor signal MON2 from the second photoelectric converter 55. The second phase adjustment electrode 15e receives the phase adjustment signal SUB_P2 from the difference circuit 67k. For example, the phase-adjustment bias circuits 67e and 67g are set to output the voltage equal to the photoelectric voltage corresponding to the maximum monitor output from the integrated optical modulator 23. This voltage is acquired in advance before system adjustment.

A second differential signal (control signal) SUB from the signal processing circuit 67 is input to an adder 29f of the second driver circuit 29. A signal from a second bias DC voltage source (second bias circuit) 29e is also input to the adder 29f. The second differential signal (control signal) SUB and the signal from the second bias circuit 29e are added together by the adder 29f. The adder 29f feeds an instruction signal ADJ2 to a second bias tee circuit 29d such that the two MZ modulators 13 and 15 have equal optical amplitudes. A second amplification circuit 29c receives a bias signal from a second bias circuit 29a and a radiofrequency signal RF and drives the second bias tee circuit 29d. The second bias tee circuit 29d generates an RF drive signal DRV2 based on the third differential signal (instruction signal) ADJ2 from the adder 29f and the signal from the second amplification circuit 29c. The first driver circuit 27 includes a first bias circuit 27a, a first amplification circuit 27c, a first bias tee circuit 27d, and a first bias DC voltage source (first bias circuit) 27e and generates an RF drive signal DRV1. In this example, the first bias circuit 27a and the second bias circuit 29a supply bias signals (voltages) to the first amplification circuit 27c and the second amplification circuit 29c, respectively, such that the RF drive signals DRV1 and DRV2 set by the first amplification circuit 27c and the second amplification circuit 29c have equal signal amplitudes. Thus, the first driver circuit 27 includes the first bias circuit 27e, which sets the bias point of the RF drive signal DRV1, and the first amplification circuit 27c, which sets the signal amplitude of the RF drive signal DRV1. The second driver circuit 29 includes the second bias circuit 29e, which sets the bias point of the RF drive signal DRV2, and the second amplification circuit 29c, which sets the signal amplitude of the RF drive signal DRV2. The RF drive signals DRV1 and DRV2 applied to the first MZ modulator 13 and the second MZ modulator 15 have equal amplitudes. The second bias tee circuit 29d receives, as a bias voltage, the instruction signal ADJ2 generated by the adder 29f from the second differential signal (control signal) SUB and the signal from the second bias circuit 29e. The first bias tee circuit 27d receives a bias voltage from the first bias circuit 27e. Thus, the RF drive signals DRV1 and DRV2 have different bias voltages. The bias voltages of the RF drive signals DRV1 and DRV2 can be controlled to reduce distortion in the optical signal. In this example, the second driver circuit 29 (at least one of the first driver circuit 27 and the second driver circuit 29) adjusts the bias point of the drive signal such that the intensity of the modulated light output from the first MZ modulator 13 matches the intensity of the modulated light output from the second MZ modulator 15.

In this example, the bias voltage applied to the QPSK modulator is controlled, for example, feedback-controlled, such that the I signal and the Q signal have equal output intensities. As in the example in which the amplitude is controlled, the difference circuit 67a generates the difference in output intensity between the I signal and the Q signal, and the signal processing circuit 67 performs zero convergence voltage control such that the difference is zero (or sufficiently low). In this manner, for example, the bias voltage to be applied to the modulation electrode for the Q signal is generated.

In FIGS. 8 and 9, the first driver circuit 27 is connected to the electrode of the first arm waveguide 13a of the first MZ modulator 13. The electrode of the second arm waveguide 13b of the first MZ modulator 13 is grounded. The second driver circuit 29 is connected to the electrode of the first arm waveguide 15a of the second MZ modulator 15. The electrode of the second arm waveguide 15b of the second MZ modulator 15 is grounded.

Figure 10:
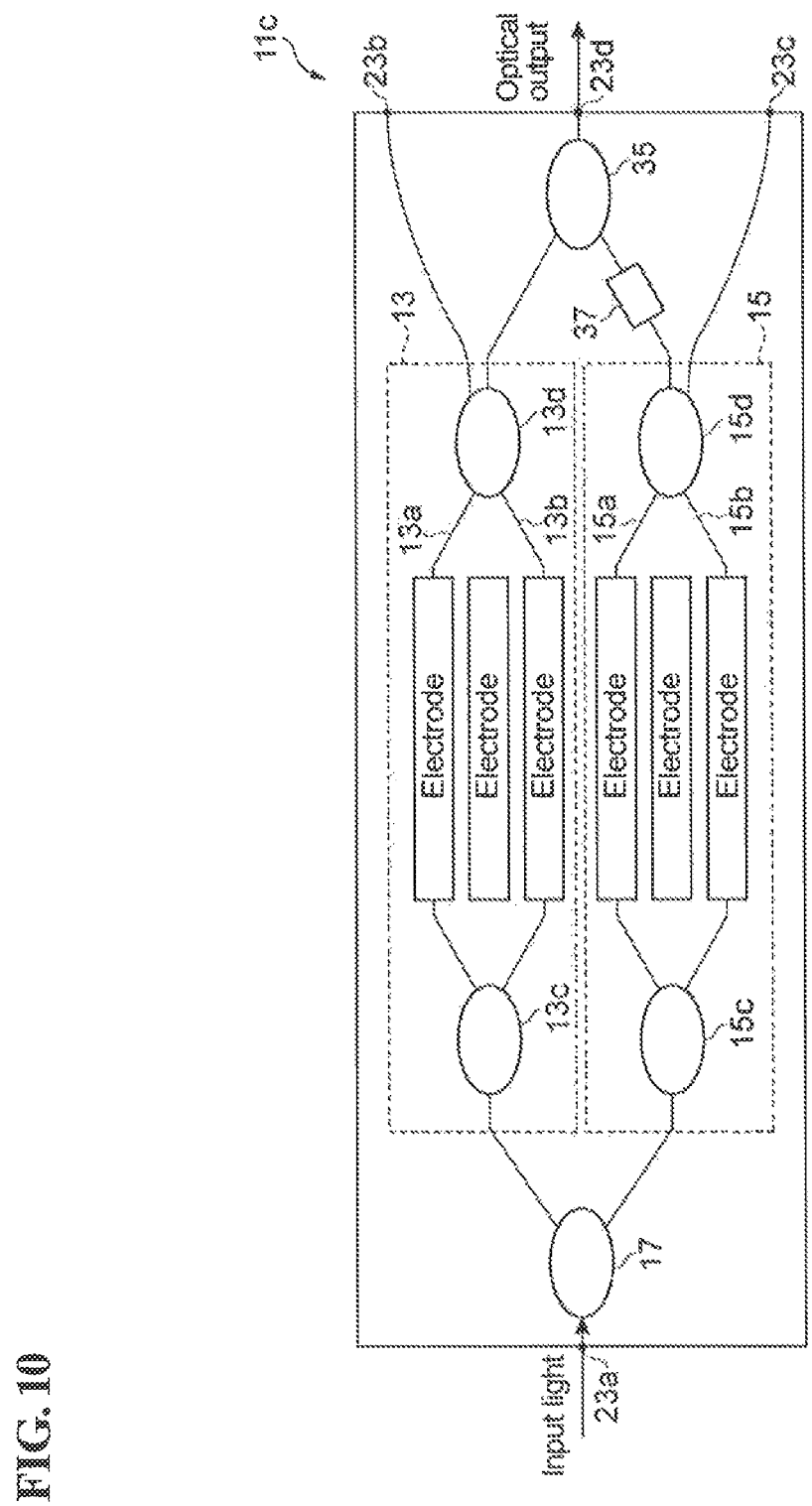
FIG. 10 illustrates an optical modulator including MZ modulators that modulate input light using a differential signal.

FIG. 10 illustrates an optical modulator including MZ modulators that modulate input light using a differential signal. An optical modulator 11c illustrated in FIG. 10 includes ground electrodes located between two arm waveguides 13a and 13b and between two arm waveguide 15a and 15b. In the optical modulator 11c illustrated in FIG. 10, the first driver circuit 27 drives the first arm waveguide 13a and the second arm waveguide 13b of the first MZ modulator 13 depending on a differential signal. The second driver circuit 29 drives the first arm waveguide 15a and the second arm waveguide 15b of the second MZ modulator 15 depending on a differential signal. The first driver circuit 27 and the second driver circuit 29 include a differential amplifier, for example.

Figure 11:
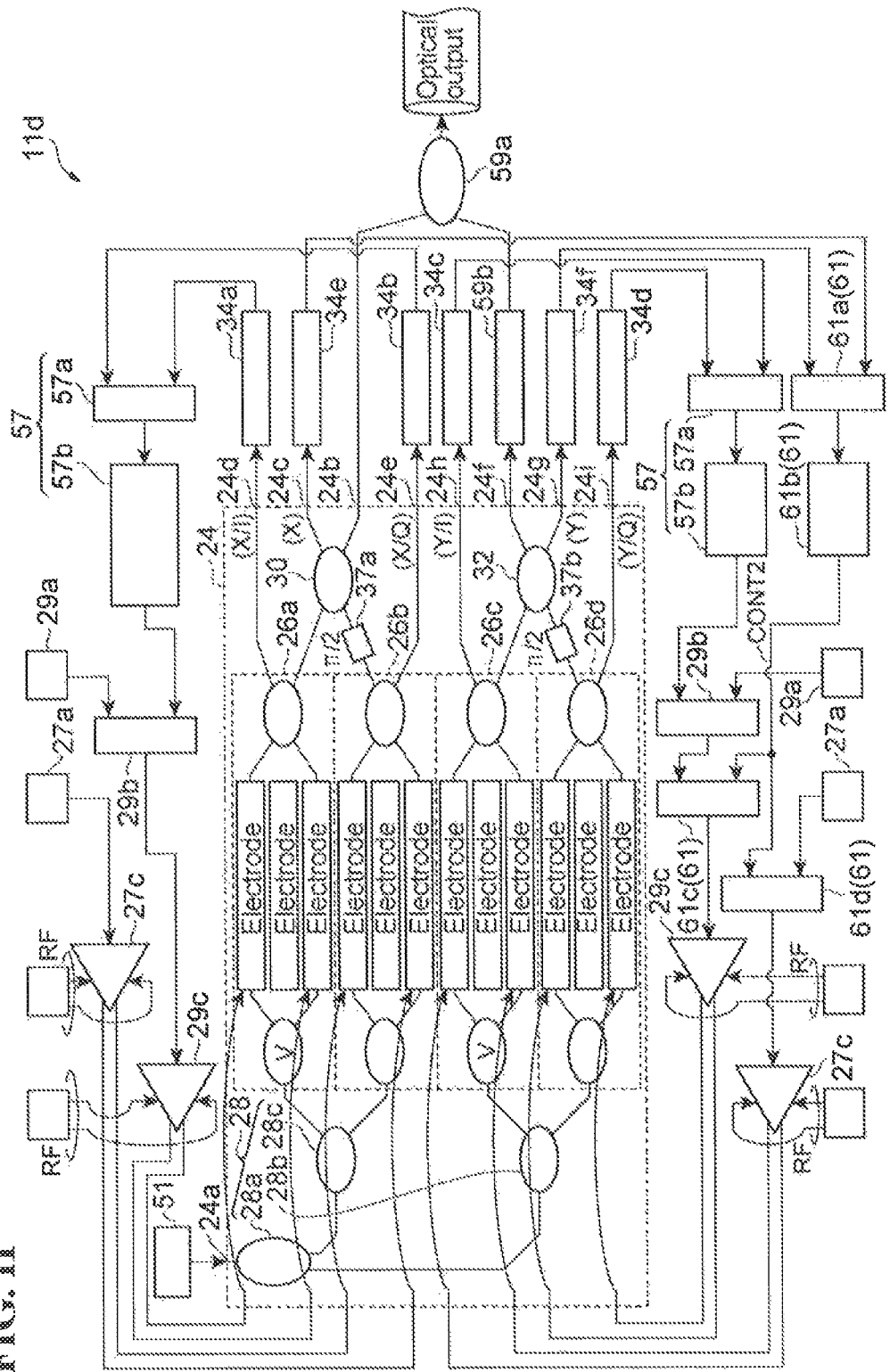
FIG. 11 illustrates a dual-polarization quadrature phase-shift keying (DP-QPSK) modulator configured for feedback control of the voltage amplitude at which the optical modulator is driven.

FIG. 11 illustrates a dual-polarization quadrature phase-shift keying (DP-QPSK) optical modulator 11d configured for feedback control of the voltage amplitude at which the optical modulator 11d is driven. An integrated optical modulator 24 includes four MZ modulators 26a, 26b, 26c, and 26d. The MZ modulators 26a, 26b, 26c, and 26d receive input light from a light input 24a through branching waveguides 28 (branching units 28a, 28b, and 28c). The branching waveguides 28 generally have variations in branching ratio. The MZ modulators 26a and 26b are connected to a branching waveguide 30. The branching waveguide 30 is connected to a main light output 24b and a monitor output (X) 24c. The MZ modulator 26a has a light output waveguide connected to an input port of the branching waveguide 30 and a light output waveguide connected to a monitor output (X/I) 24d. The MZ modulator 26b has a light output waveguide connected to an input port of the branching waveguide 30 and a light output waveguide connected to a monitor output (X/Q) 24e. A π/2 phase shifter 37a is connected between the light output waveguide of the MZ modulator 26b and the input port of the branching waveguide 30. The MZ modulators 26c and 26d are connected to a branching waveguide 32. The branching waveguide 32 is connected to a main light output 24f and a monitor output (Y) 24g. The MZ modulator 26c has a light output waveguide connected to an input port of the branching waveguide 32 and a light output waveguide connected to a monitor output (Y/I) 24h. The MZ modulator 26d has a light output waveguide connected to an input port of the branching waveguide 32 and a light output waveguide connected to a monitor output (Y/Q) 24i. A π/2 phase shifter 37b is connected between the light output waveguide of the MZ modulator 26d and the input port of the branching waveguide 32.

One of the main outputs 24b and 24f is optically coupled to a multiplexer 59a. The other main output is optically coupled to the multiplexer 59a via a polarization rotator 59b. The monitor outputs 24d and 24e are connected to a signal processing circuit 57 via photoelectric converters 34a and 34b, respectively. As in the control in the optical modulator 11a illustrated in FIG. 8, the monitor outputs 24d and 24e are used to control the amplitude of the drive signal in one driver circuit (for example, the driver circuit 29).

The monitor outputs 24h and 24i are connected to a signal processing circuit 57 via photoelectric converters 34c and 34d, respectively. As in the control in the optical modulator 11a illustrated in FIG. 8, the monitor outputs 24h and 24i are used to control the amplitude of the drive signal in one driver circuit (for example, the driver circuit 29). In addition, the monitor outputs 24c and 24g are connected to a signal processing circuit 61 via photoelectric converters 34e and 34f, respectively. The signal processing circuit 61 includes a difference circuit 61a that generates a signal corresponding to the difference between the monitor outputs 24c and 24g. The difference between the monitor outputs 24c and 24g indicates the difference in light intensity between the multiplexed light from the MZ modulators 26a and 26b and the multiplexed light from the MZ modulators 26c and 26d. A square operation circuit 61b receives the signal output from the difference circuit 61a and generates a second differential signal (control signal) CONT2. The signal processing circuit 61 generates the control signal CONT2 such that the intensity of the multiplexed light from the MZ modulators 26c and 26d is equal to the intensity of the multiplexed light from the MZ modulators 26a and 26b. Therefore, an adder 61c adds the control signal CONT2 to a signal from an adder 29b. The output of the adder 61c is connected to a second amplification circuit 29c. The second amplification circuit 29c adjusts the drive signal for driving the MZ modulator 26d depending on the control signal CONT2. The drive signal for the MZ modulator 26d contains the adjustment based on the multiplexed light from the MZ modulators 26a and 26b and the adjustment based on the light from the MZ modulator 26c. An adder 61d adds the control signal CONT2 to a signal from a second bias circuit 27a. An amplification circuit 27c adjusts the drive signal for driving the MZ modulator 26c depending on the control signal CONT2.

In this example, the optical modulators 11, 11b, and 11c according to this embodiment are applied to a QPSK modulator. In the DP-QPSK modulator 11d in FIG. 11, an adjustment based on the difference in output intensity between the two polarizations is performed in addition to an adjustment based on the difference in output intensity between the two signals, i.e., the I signal and the Q signal. Thus, the illustrated configuration performs feedback control of the voltage amplitude at which the DP-QPSK modulator 11d is driven such that all of the four signal intensities are equal. For each polarization, as in the signal processing circuit 57 illustrated in FIG. 8, feedback control is performed such that the output intensities of the I signal and the Q signal are equal. In addition, control, such as feedback control, is similarly performed such that the difference in intensity between the polarizations is zero or sufficiently low. In this control, the control voltage corresponding to the difference between the I signal and the Q signal and the control voltage corresponding to the difference between the X and Y polarizations are added before the input to the driver-adjustment voltage terminals. Although FIG. 11 illustrates the control of the amplitude of the drive signal, it should be understood from the foregoing examples that the control of the amplitude of the drive signal may be replaced by the control of the phase of the drive signal. In the optical modulators 11a, 11b, and 11c, the circuits such as adders, difference circuits, and square operation circuits may be implemented by analog circuit technology using devices such as operation amplifiers. Alternatively, digital control technology using devices such as storage devices and CPUs in combination may be employed.

The present invention is not limited to the particular configurations disclosed in the above embodiment.

What is claimed is:

1. An optical modulator comprising:
   a main input port;
   a main output port;
   a first Mach-Zehnder modulator that includes a first arm waveguide, a second arm waveguide, a first optical coupler connected to the first arm waveguide and the second arm waveguide, and a second optical coupler connected to the first arm waveguide and the second arm waveguide;
   a second Mach-Zehnder modulator that includes a first arm waveguide, a second arm waveguide, a first optical coupler connected to the first arm waveguide and the second arm waveguide, and a second optical coupler connected to the first arm waveguide and the second arm waveguide;
   a first branching waveguide optically coupling the main input port to the first Mach-Zehnder modulator and the second Mach-Zehnder modulator;
   a second branching waveguide optically coupled to a first output port of the second optical coupler of the first Mach-Zehnder modulator and to a first output port of the second optical coupler of the second Mach-Zehnder modulator, the second branching waveguide including a first input port connected to the first Mach-Zehnder modulator, a second input port connected to the second Mach-Zehnder modulator, and an output port connected to the main output port;
   a first driver circuit connected to the first Mach-Zehnder modulator, the first driver circuit generating a first drive signal having a first amplitude at a first bias point;
   a second driver circuit connected to the second Mach-Zehnder modulator, the second driver circuit generating a second drive signal having a second amplitude at a second bias point;
   a first monitor light output connected to a second output port of the second optical coupler of the first Mach-Zehnder modulator;
   a second monitor light output connected to a second output port of the second optical coupler of the second Mach-Zehnder modulator;
   a first photoelectric converter optically coupled to the first monitor light output;

a second photoelectric converter optically coupled to the second monitor light output; and a signal processing circuit connected to the first driver circuit, the signal processing circuit receiving a first monitor signal from the first photoelectric converter and a second monitor signal from the second photoelectric converter, the signal processing circuit including a difference circuit that generates a differential signal corresponding to a difference between the first monitor signal and the second monitor signal, wherein the first drive signal and the second drive signal satisfy at least one of a first condition and a second condition, the first condition is that the first amplitude differs from the second amplitude, and the second condition is that the first bias point differs from the second bias point, the first driver circuit generates the first drive signal depending on the differential signal, and the first driver circuit adjusts the first amplitude based on the differential signal such that the first Mach-Zehnder modulator outputs a modulated light having an intensity equal to an intensity of a modulated light output from the second Mach-Zehnder modulator.

2. The optical modulator according to claim 1, further comprising a π/2 phase shifter disposed between the first branching waveguide and the second Mach-Zehnder modulator or between the second branching waveguide and the first output port of the second optical coupler of the second Mach-Zehnder modulator.

3. An optical modulator comprising:
a main input port;
a main output port;
a first Mach-Zehnder modulator that includes a first arm waveguide, a second arm waveguide, a first optical coupler connected to the first arm waveguide and the second arm waveguide, and a second optical coupler connected to the first arm waveguide and the second arm waveguide;
a second Mach-Zehnder modulator that includes a first arm waveguide, a second arm waveguide, a first optical coupler connected to the first arm waveguide and the second arm waveguide, and a second optical coupler connected to the first arm waveguide and the second arm waveguide;
a first branching waveguide optically coupling the main input port to the first Mach-Zehnder modulator and the second Mach-Zehnder modulator;
a second branching waveguide optically coupled to a first output port of the second optical coupler of the first Mach-Zehnder modulator and to a first output port of the second optical coupler of the second Mach-Zehnder modulator, the second branching waveguide including a first input port connected to the first Mach-Zehnder modulator, a second input port connected to the second Mach-Zehnder modulator, and an output port connected to the main output port;
a first driver circuit connected to the first Mach-Zehnder modulator, the first driver circuit generating a first drive signal having a first amplitude at a first bias point;
a second driver circuit connected to the second Mach-Zehnder modulator, the second driver circuit generating a second drive signal having a second amplitude at a second bias point;
a first monitor light output connected to a second output port of the second optical coupler of the first Mach-Zehnder modulator;
a second monitor light output connected to a second output port of the second optical coupler of the second Mach-Zehnder modulator;
a first photoelectric converter optically coupled to the first monitor light output;
a second photoelectric converter optically coupled to the second monitor light output; and
a signal processing circuit connected to the first driver circuit, the signal processing circuit receiving a first monitor signal from the first photoelectric converter and a second monitor signal from the second photoelectric converter, the signal processing circuit including a difference circuit that generates a differential signal corresponding to a difference between the first monitor signal and the second monitor signal, wherein the first drive signal and the second drive signal satisfy at least one of a first condition in which the first amplitude differs from the second amplitude, and a second condition in which the first bias point differs from the second bias point, and the first driver circuit generates the first drive signal depending on the differential signal the first driver circuit adjusting the first bias point by changing a bias voltage based on the differential signal such that the first Mach-Zehnder modulator outputs a modulated light having an intensity equal to an intensity of a modulated light output from the second Mach-Zehnder modulator.

4. The optical modulator according to claim 3, wherein
the first Mach-Zehnder modulator includes a phase adjustment electrode, and
the second Mach-Zehnder modulator includes a phase adjustment electrode,
the optical modulator further comprising:
a first phase adjustment circuit connected to the phase adjustment electrode of the first Mach-Zehnder modulator; and
a second phase adjustment circuit connected to the phase adjustment electrode of the second Mach-Zehnder modulator, wherein
the first phase adjustment circuit receives the first monitor signal from the first photoelectric converter and generates a first phase adjustment signal from the first monitor signal, and
a second phase adjustment circuit receives the second monitor signal from the second photoelectric converter and generates a second phase adjustment signal from the second monitor signal.

5. The optical modulator according to claim 1, wherein
the first driver circuit includes a first bias circuit that sets the first bias point and a first amplification circuit that sets the first amplitude, and
the second driver circuit includes a second bias circuit that sets the second bias point and a second amplification circuit that sets the second amplitude.

6. The optical modulator according to claim 1, wherein
the first arm waveguide of the first Mach-Zehnder modulator has an electrode that is connected to the first driver circuit,
the second arm waveguide of the first Mach-Zehnder modulator has an electrode that is grounded,
the first arm waveguide of the second Mach-Zehnder modulator has an electrode that is connected to the second driver circuit, and
the second arm waveguide of the second Mach-Zehnder modulator has an electrode that is grounded.

7. An optical modulator comprising:
a main input port;

a main output port;

a first Mach-Zehnder modulator that includes a first arm waveguide and a second arm waveguide;

a first driver circuit connected to the first Mach-Zehnder modulator, the first driver circuit generating a first drive signal having a first amplitude at a first bias point, the first driver circuit including a differential amplifier driving the first arm waveguide and the second arm waveguide of the first Mach-Zehnder modulator depending on a differential signal;

a second Mach-Zehnder modulator that includes a first arm waveguide and a second arm waveguide;

a second driver circuit connected to the second Mach-Zehnder modulator, the second driver circuit generating a second drive signal having a second amplitude at a second bias point, the second driver circuit including a differential amplifier driving the first arm waveguide and the second arm waveguide of the second Mach-Zehnder modulator depending on a differential signal; and a first branching waveguide optically coupling the main input port to the first Mach-Zehnder modulator and the second Mach-Zehnder modulator, wherein the first drive signal and the second drive signal satisfy at least one of a first condition in which the first amplitude differs from the second amplitude, and a second condition in which the first bias point differs from the second bias point.

8. The optical modulator according to claim 1, wherein the first Mach-Zehnder modulator, the second Mach-Zehnder modulator, and the first branching waveguide are disposed on a single substrate.

* * * * *